INVENTORS
A. H. BOBECK
U. F. GIANOLA
R. C. SHERWOOD
W. SHOCKLEY
BY Herbert M. Shapiro
ATTORNEY United States Patent Office 3,460,116

Patented Aug. 5, 1969

3,460,116
MAGNETIC DOMAIN PROPAGATION CIRCUIT

Andrew H. Bobeck, Chatham, Umberto F. Gianola, Florham Park, and Richard C. Sherwood, New Providence, N.J., and William Shockley, Santa Clara, Calif., assignors to Bell Telephone Laboratories, Incorporated, Murray Hill, N.J., a corporation of New York Filed Sept. 16, 1966, Ser. No. 579,931
Int. Cl. G11c *5/02*
U.S. Cl. 340—174 16 Claims

ABSTRACT OF THE DISCLOSURE

A two-dimensional shift register is realized in a single sheet of magnetic material by defining self-bounded (single wall) reverse-magnetized domains free to move in any direction in the sheet. A simple arrangement for the propagation of the domains is made possible by the use of a material having substantially isotropic properties in the plane of the sheet and a preferred direction of magnetization out of that plane.

This invention relates to information processing arrangements and, more particularly, to such arrangements employing media through which information may be propagated.

Information frequently is moved through a propagation medium such as a magnetic thin film in a shift register type of operation as is well known. Such operation is described, for example, in K. D. Broadbent Patent No. 2,919,432, issued Dec. 29, 1959. That patent specifically describes a thin film domain wall shift register in which a reverse magnetized domain, bounded by leading and trailing domain walls, is nucleated at an input position in the film and propagated along a first axis in the film by a step-along multiphase propagation field. Such a domain wall device usually requires an anisotropic magnetic film where propagation of a reverse domain is either along the easy or, alternatively, along the hard axis and the domain walls bounding that reverse domain extend to the edge of the film in the direction orthogonal to the axis of propagation. Inasmuch as the walls of the domain are bounded by the edge of the film, propagation of those domains is constrained to an axis along the transverse dimension of the film.

It is also known that a reverse magnetized domain may be bounded by a single domain wall. Such a domain differs from the reverse domain propagated in the aforementioned Broadbent patent specifically in that the single domain wall, encompassing the former, has a shape independent of the geometry of the film or, in other words, is not bounded by the edge of the film. These domains are referred to herein as single wall domains. Such domains are shown for example, in the Journal of Applied Physics, volume 30, pages 217–225, February 1959, in an article by R. C. Sherwood, J. P. Remeika, and H. J. Williams entitled "Domain Behavior in Some Transparent Magnetic Oxides."

Copending application Ser. No. 579,995, filed Sept. 16, 1966, for P. C. Michaelis discloses various information storage and propagation arrangements wherein single wall domains are propagated along orthogonal axes in an anisotropic magnetic film. This invention is based, in one aspect thereof, on the realization that a single wall domain may be provided and moved, controllably, in a simple manner in magnetic materials having substantially like magnetic properties regardless of direction in the plane of the sheet and, conveniently, also having a preferred direction of magnetization (out of) illustratively normal to the plane of the sheet. The characteristic of substantially like properties in the plane of the sheet permits the movement of a single wall domain controllably along transverse axes in the plane of the sheet by like, relatively simple propagation means. A preferred magnetization direction normal to the plane of the film permits information storage without necessitating a more complicated propagation means.

Accordingly, an object of this invention is to provide a new and novel information storage and propagation arrangement.

Another object of this invention is to provide an information storage and propagation arrangement in which information may be moved in a propagation medium along first and second axes oriented in transverse directions with respect to one another.

The foregoing and further objects of this invention are realized in one embodiment thereof wherein single wall domains are provided at an input position in a sheet of yttrium orthoferrite material in a manner representative of information. The domains are propagated, by a multiphase propagation field, to a remote output position where they provide indications of the input information in a shift register type operation.

In another embodiment of this invention a plurality of shift register channels are defined in a sheet of yttrium orthoferrite material. Single wall domains are provided in a first channel in a manner representative of information and moved, in parallel, to a second channel where the domains are advanced to an output position for detection.

A feature of this invention is an information storage and propagation arrangement including a sheet of a magnetic material substantially isotropic in the plane of the sheet and having a preferred magnetization direction normal to the plane of the sheet, means providing a single wall domain at an input position in the sheet, and multiphase means providing step-along fields between the input and an output position in the sheet for incrementally moving the domain to the output position.

The foregoing and further objects and features of this invention will be understood more fully from a consideration of the following detailed description rendered in conjunction with the accompanying drawing, in which.

Figure 1:
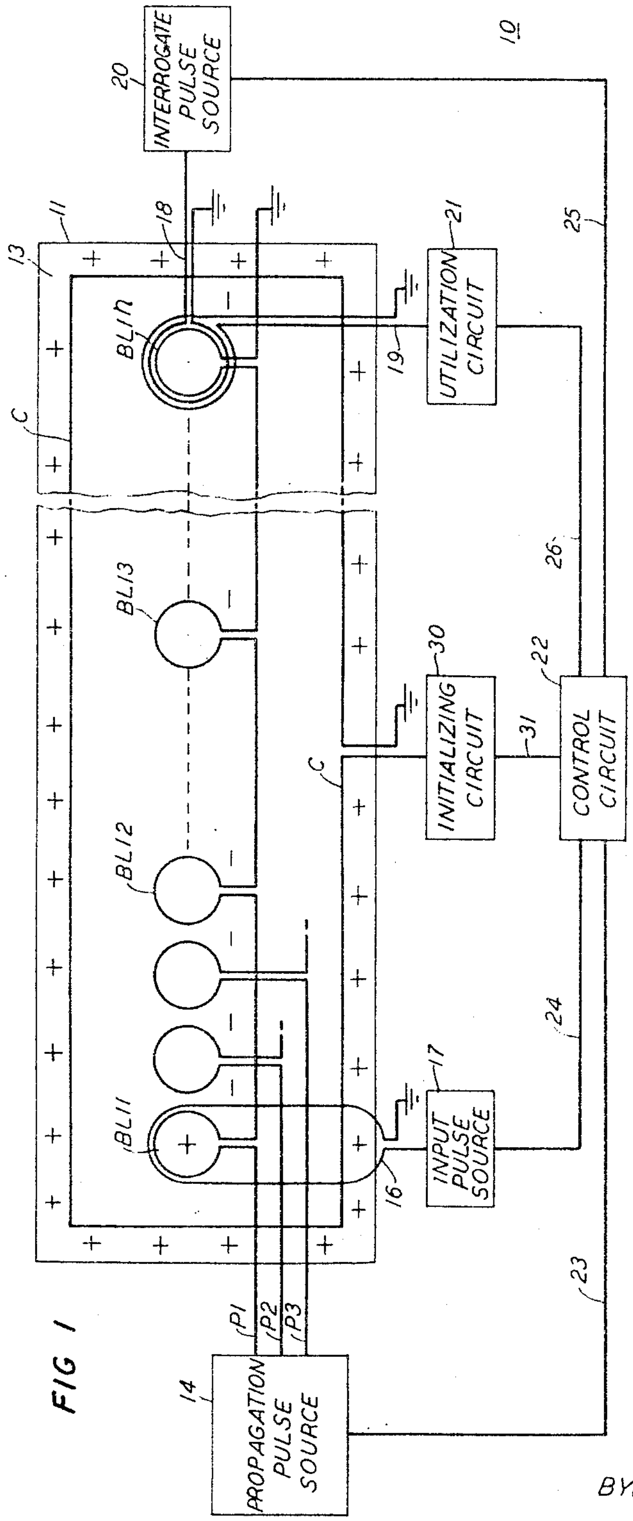
FIGS 1 and 6 are schematic illustrations of shift register arrangements in accordance with this invention.

FIG. 1 is a schematic top view of a shift register 10 in accordance with one aspect of this invention. The register 10 comprises a sheet 11 of a material having substantially like properties in the plane of the sheet and having a preferred magnetization direction illustratively normal to the plane of the sheet. Flux directed out of the paper, as viewed, normal to the plane of the sheet is represented by a plus sign; flux directed into the paper is represented by a minus sign. Sheet 11 includes a border portion 13. Flux in the border is assumed to be directed out of the plane of the sheet and thus is represented by plus signs. In the remainder of the film 11, flux is assumed directed into the plane of the sheet and thus is represented by negative signs. It is clear that a domain wall is defined between the positive and negative portions of the sheet. Sheet 11, which is for example yttrium orthoferrite, is conveniently provided, in a manner discussed further hereinafter, such that the positive border 13 has an area related to the negative remaining area such that the sheet as a whole is essentially in a demagnetized condition.

Figure 2:
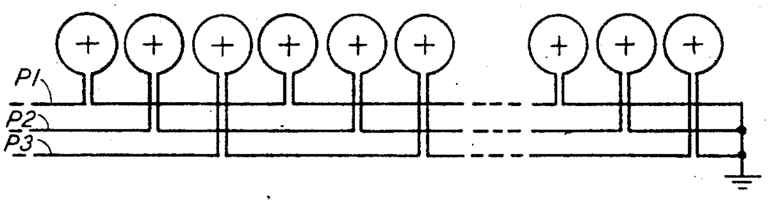
FIG. 2 is a schematic illustration of a propagation circuit for the shift registers of FIGS. 1 and 6.

Conductors P1, P2, and P3 overlie film 11. Each of conductors P1, P2, and P3 includes a series of circular (conducting) loops. The loops included in conductor P1 define bit locations BL11, BL12, BL13 . . . BL1$n$ in sheet 11. The loops in conductors P2 and P3 are correspondingly positioned to define buffer regions between bit locations in sheet 11. The conductors form a three-phase propagation circuit, each circuit including loops adjacent the loops of next adjacent propagation conductors along a single axis, as shown in FIG. 2, to move a single wall domain in a step-along manner when pulsed consecutively as is described further hereinafter. Actually, the single wall domain occupies a space slightly larger than the conducting loop such that the next adjacent loop overlaps the domain. The space occupied by such a domain, of course, is a function of the parameters of the magnetic material and the sheet geometry in a manner consistent with well established principles. Alternatively, the conducting loops of next adjacent propagation conductors overlap to provide propagation in a manner analogous to that disclosed in the aforementioned Broadbent patent. Each of conductors P1, P2, and P3 is connected between a propagation pulse source 14 and ground also as shown in FIG. 2.

An input conductor 16 couples an input portion of sheet 11 including bit location BL11 and is connected between an input pulse source 17 and ground. Similarly, interrogate and sense conductors 18 and 19 couple bit location BL1$n$ and are connected, respectively, between an interrogate pulse source 20 and ground and between a utilization circuit 21 and ground.

Pulse sources 14, 17, and 20, and utilization circuit 21 are connected to a control circuit 22 by means of conductors 23, 24, 25, and 26, respectively. The various pulse sources and circuits may be any such elements capable of operating in accordance with this invention.

The operation of the shift register of FIG. 1 is described first followed by a discussion of alternative input and sense implementations. Thereafter a shift register operable on a two-dimensional basis in accordance with another aspect of this invention is described. It will become clear that the sheet characteristics are particularly advantageous in enabling operation on a two-dimensional basis with a particularly simple propagation means.

Figure 3:
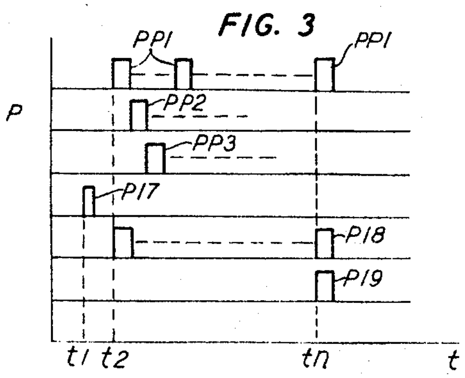
FIG. 3 is a pulse diagram of the operation of the shift register of FIG. 1.

FIG. 3 is a pulse diagram of the operation of the shift register 10 of FIG. 1. During operation, input pulse source 17 selectively applies a negative pulse (for the geometry shown) to conductor 16 to drive to a positive magnetization direction the portion of sheet 11 encompassed by that conductor. The input pulse is represented as pulse form P17 in the pulse diagram of FIG. 3 shown at time $t1$ there. Illustratively, propagation conductors P1, P2, and P3 are pulsed in sequence by propagation pulse source 14 starting at a time $t2$ subsequent to time $t1$. The propagation pulses are represented as pulse forms PP1, PP2, and PP3 in FIG. 3. Sources 14 and 17 are operated under the control of control circuit 22.

Figure 4:
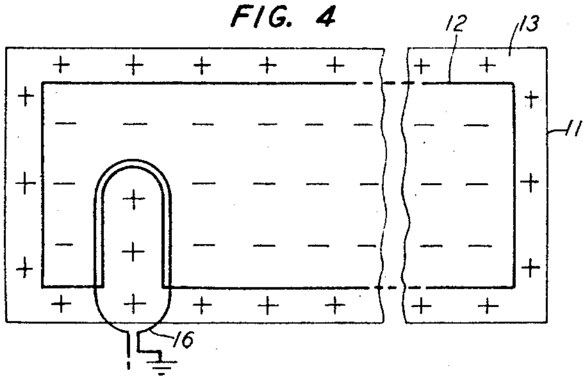
FIGS. 4 and 5 are schematic illustrations of an input circuit for the shift register circuits of FIGS. 1 and 6.
Figure 5:
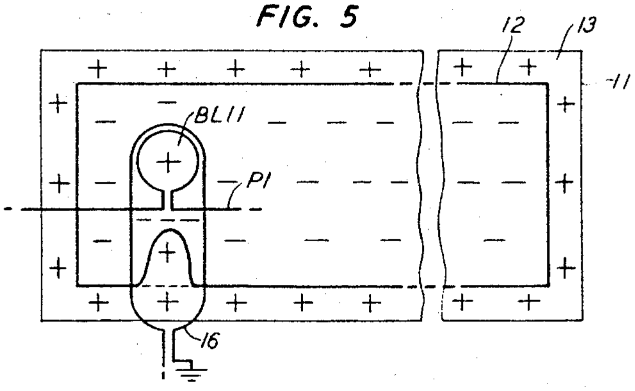

Initially the magnetic condition of sheet 11 is assumed to be positive in the border portion 13 and negative within the remainder of the sheet. When the input pulse P17 is applied, an area of positive magnetization appears within the initially negative area as shown in FIG. 4. The input pulse terminates permitting the (illustratively) later applied propagation pulse PP1 to isolate a single wall domain, i.e., a positive region, at bit location BL11 as shown in FIG. 5. In isolating such a positive region, the pulse PP1 "drives" the portion of the sheet surrounding that bit location to a negative magnetization as is also shown in FIG. 5. A small positive region remains extending in from the border 13 towards bit location BL11. We will have occasion to discuss that region again later.

It is clear then that at time $t2$ of FIG. 3 a positive region is provided at bit location BL11 in sheet 11. Such a positive region may be taken as representative of a binary one. Had an input pulse Pi been absent at time $t1$, no such positive region is so formed and a binary zero is considered stored. Regardless of the information stored, the succession of propagation pulses advances that information from one bit location to the next in, illustratively, three phases. The fields provided by the propagation pulses in consecutively pulsed propagation conductors operate to translate the single wall domain essentially by providing consecutively offset potential minima into which the domain "falls."

Every first propagation pulse PP1 is accompanied (conveniently followed) by an interrogate pulse P18 under the control of control circuit 22. After $n-1$ sets of (three) propagation pulses are applied, at a time $tn$ in FIG. 3, the positive single wall domain stored at time ($t1$ and) $t2$ in bit location BL11 reaches bit location BL1$n$. In response to the interrogate pulse applied at time $tn$, bit location BL1$n$ is driven to a negative magnetization condition (by the collapse of the domain there) inducing a pulse P19 in conductor 19 for detection by utilization circuit 21 under the control of control circuit 22. Such a pulse is indicative of a stored binary "one." Had an input pulse been absent at time $t1$, only a negligible shuttle pulse appears at the corresponding time $tn$. Thus, if an illustrative code 1011 is written (consecutively) into bit location BL11, output pulses appear in conductor 19 in the code—pulse, no pulse, pulse, pulse, as (after) consecutive propagation pulses are applied to propagation conductor P1.

The propagation direction is reversed by reversing the propagation pulse sequence.

An illustrative shift register operation has now been described in accordance with one aspect of this invention. It is apparent, however, that the embodiment described is wasteful of useful area in the magnetic sheet since the border area 13 of sheet 11 is not used. The border area of sheet 11, however, may comprise smaller and smaller areas of sheet 11 near the input position as materials of higher and higher sheet coercive force are used. All that is required illustratively is that an area of positive (reverse) magnetization be available as a source of single wall domains as described. Ideally, the positive area need be no larger than the portion of the border and the extension thereof into the initially negative area as shown in FIG. 4. The arrangement with the larger border is shown in FIG. 1 because it is a particularly convenient geometry prepared simply by heating sheet 11 initially, as is well known, to a temperature such that both positive and negative domains are formed in the sheet when the sheet is later cooled to room temperature. Then the positive domains are removed from all areas except the border portion by providing the appropriate fields.

The inner boundary of the border portion 13 of FIG. 1 may be thought of as the path of a conductor C which closes on itself. When that conductor C is pulsed, an appropriate propagation field is provided for rearranging the domains in the magnetic sheet to provide the border configuration shown in FIG. 1. To this end, conductor C is connected between an initializing circuit 30 and ground and is operated under the control of control circuit 22 to which it is connected by means of conductor 31 as shown in FIG. 1. Alternatively, conductor C is connected electrically in series with the propagation conductors in a manner to couple sheet 11 to provide the magnetic configuration of FIG. 1 when a propagation conductor is pulsed.

The positive border, as has been stated, permits the magnetic sheet as a whole to be in an essentially demagnetized condition. Further, the net demagnetizing field on each bit location is reduced by distribution of a number of positive domains throughout the magnetic sheet in contradistinction to a positive border. The manner of preparing a magnetic sheet with such a distribution is analogous to that described above. It is contemplated that such positive domains may also serve as the source of positive single wall domains as described.

The described method of providing single wall domains in accordance with one aspect of this invention enables a convenient supply of such domains in materials such as yttrium orthoferrite which require high fields for nucleating such domains in an initialized material. Specifically, yttrium orthoferrite requires a nucleation field in excess of 500 oersteds yet only requires about one oersted to propagate a single wall domain. That method is merely one illustrative way of supplying inputs particularly for high nucleation threshold material. For relatively low nucleation threshold materials, a nucleation field provided in a localized area of the sheet suffices. For high nucleation threshold materials, sufficiently high drives also provide single wall domains in a like manner.

The output has been described in terms of an interrogate and sense implementation. Such an output means is not required. The passage of single wall domains past an output position induces a voltage in a sense conductor coupled to that position for providing a detectable output therein. Also, the reflection and transmission characteristics of a single wall domain differ from the sheet characteristics permitting conventional optical readout.

Two-dimensional operation of a shift register in accordance with a further aspect of this invention may be visualized as a plurality of shift registers arranged as horizontal rows, as shown in FIG. 1, in a single sheet of magnetic material. Now visualize a plurality of like registers oriented transverse, illustratively orthogonally, along vertical columns with respect to the first set of registers. A positive single wall domain at a given bit location in such a sheet then may be moved in a prescribed one of four directions.

Figure 6:
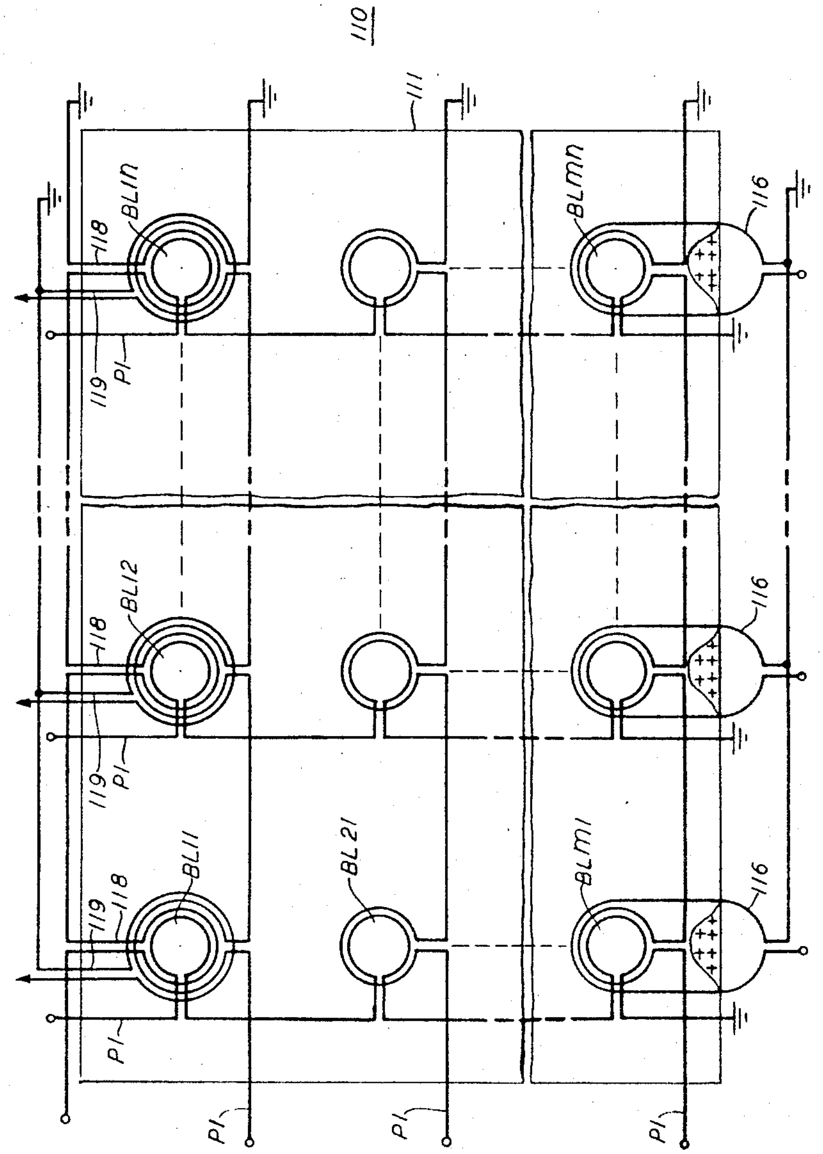

FIG. 6 shows one such two-dimensional shift register 110. Shift register 110 includes a sheet 111 of yttrium orthoferrite having orthogonally arranged sets of propagation conductors of the type shown in FIG. 2 intersecting at bit locations BL11 . . . BL*mn* as shown in FIG. 6. Only conductor P1 of each shift register channel is shown for simplicity. It is to be understood, however, that each channel includes conductors P1, P2, and P3 as shown in FIG. 2. An input conductor 116 is shown coupled illustratively to each bit location in row *m* of the matrix and encompassing an initialized positive area (domain). Similarly, interrogate and sense conductors 118 and 119 are coupled, illustratively, to each bit location in row 1 of the matrix. It is clear that information, such as the binary word 1011, may be stored in the shift register channel of column 1, advanced serially therethrough as already described, and moved to the right, as viewed, for example in parallel to another channel before providing indicative outputs there. Alternatively, information may be stored in the *m*th row in parallel at the input positions there. The information so stored then may be advanced in parallel in columns and moved serially in rows. It is clear that series or parallel operation is dependent upon whether or not the progagation conductors are pulsed individually or in parallel as in well understood in the art. The structure is symmetrical and the specific mode of information transfer and the means for effecting that transfer are clear from the discussion of the shift register of FIG. 1 without further discussion. The various drivers and circuits for the embodiment of FIG. 6 are entirely analogous to those employed in connection with the shift register of FIG. 1.

Information is moved through the magnetic sheet 111 of FIG. 6 in the simple manner described in the absence of external transfer, logic, and amplifying circuitry permitting multiple channel information shifting devices at greatly reduced costs. In addition, a variety of other arrangements are permitted by the simple arrangement of FIG. 6. For example, the movement of single wall domain in yttrium orthoferrite may be observed during experimentation by means of the selective reflection (Kerr effect) and transmission (Faraday effect) of polarized light. The use of polarized light in this manner not only enables an alternative readout mode as mentioned hereinbefore but also leads to the implementation of important new uses. Specifically, it is contemplated to move a single wall domain back and forth across a sheet of material of the type described along a path similar to that traversed by an electron beam in a television tube thus providing an implementation for a variety of display devices. Alternatively, the magnetic pattern in the sheet may be observed directly through a magnetic tape viewer. This method of viewing is particularly useful because the preferred magnetization direction is out of the plane of the sheet and, accordingly, also is useful for display devices. Another contemplated use is the selective illumination of a PNPN photodiode in a matrix of photodiodes by the movement of a single wall domain to an appropriate position to pass "select" light to the desired diode. It is contemplated to perform sorting and encoding operations also by separating information in one channel and inserting information from other therebetween in a maner analogous to that indicated in the copending application of P. C. Michaelis noted above.

The invention has been disclosed in terms of an yttrium orthoferrite sheet. Such a material enables complete flexibility of propagation in the plane of the sheet. That is to say, such "substantially isotropic" sheets permit propagation along *n* transverse axes shown illustratively along two orthogonal axes. To this end, intersecting propagation circuits may be arranged at any angle to one another, and move than two such circuits may be employed. The property of a preferred magnetization direction substantially normal to the sheet characteristic of such materials is convenient in that it permits simple drive configuration as has been stated hereinbefore.

There are a multitude of materials having a preferred direction of magnetization out of the plane of a sheet of the material, for example, the rare earth orthoferrites, manganese bismuth, magneto plumbite, barium ferrite, strontium ferrite, et cetera. The choice of a particular material depends on practical considerations however. Specifically, a practical material advantageously exhibits a low magnetization to insure domain stability against magnetostatic fields in thin sheets of the material. In addition, a practical material exhibit a low to moderate and a uniform (or, alternatively, controlled) coercivity to domain wall motion. The material is also characterized by a nucleation field threshold for magnetization reversal in the absence of domain walls which is substantially higher than the wall motion threshold and also reasonably uniform. These properties are exhibited by the canted antiferromagnet yttrium orthoferrite having its C-axis normal to the plane of the sheet.

It is clear then that single wall domains that are substantially equally extended in both directions (i.e., circular as shown) can be moved so as to accomplish the desired functions in sheets of materials in which certain preferred propagation directions for the domain are not imposed by anisotropic effects and in which the component of magnetization normal to the sheet is not so large that demagnetizing effects control the domain shapes. It is further clear that a simple case of such a material is yttrium orthoferrite, as described, in which all the relevant magnetic properties are substantially isotropic in the plane perpendicular to the preferred direction of magnetization. Such materials are described as substantially isotropic in the plane of the sheet herein. Further, materials with single wall domains of anisotropic (noncircular) shapes can be utilized by appropriately adapting the proportions of the driving circuits.

The described propagation conductors provide fields in the magnetic sheet normal to the plane of the sheet. It is not necessary that crystalline anisotropy of the material in the sheet be arranged in this direction. The sheet need only by arranged to permit magnetization normal to the sheet. It is expected that a sheet of isotropic material having a sufficient thickness and/or having a sufficiently low magnetization would be suitable to this end.

What has been described is considered only illustrative of the principles of this invention. Accordingly, various and numerous other arrangements may be devised by one skilled in the art without departing from the spirit and scope of this invention.

What is claimed is:

1. A combination comprising a sheet of a magnetic material substantially isotropic in the plane of the sheet and having a preferred magnetization direction out of the plane of the sheet, input means for providing at an input position in said sheet a single wall domain having a boundary unconstrained by the boundary of said sheet and being free to move in a plurality of directions in the plane of said sheet, and first propagation means for controllably moving said domain in a first direction in said sheet in a manner such that said domain does not expand uncontrollably in any other direction.

2. A combination in accordance with claim 1 wherein said material has a preferred magnetization direction substantially normal to the plane of said sheet.

3. A combination in accordance with claim 2 including second propagation means for controllably moving said domain in said sheet along a second axis transverse to said first axis.

4. A combination in accordance with claim 2 including means coupled to an output position along said first axis for detecting the presence of a single wall domain there.

5. A combination in accordance with claim 3 including means coupled to an output position along said second axis for detecting the presence of a single wall domain there.

6. A combination in accordance with claim 2 wherein said input means comprises a source of reverse magnetization for defining a domain wall in said sheet, means for extending the area of reverse magnetization, and means for separating a single wall domain from the extended area.

7. A combination comprising a sheet of magnetic material substantially isotropic in the plane of the sheet and having a preferred magnetization substantially normal to the plane of the sheet, means for defining in said sheet a plurality of first shift register channels each including bit locations, means for defining in said sheet a plurality of second shift register channels transverse to said first shift register channels and also including bit locations, means for selectively writing at input positions in selected shift register channels information as the presence and absence of single wall domains having boundaries unconstrained by that of said sheet and being free to move in a plurality of directions in the plane of said sheet, means for controllably moving single wall domains from bit location to bit location in a selected direction in said sheet in the absence of uncontrolled expansion thereof in nonselected directions, and means for selectively detecting the presence and absence of single wall domains in output positions in said shift register channels.

8. A combination in accordance with claim 7 wherein each of said second shift register channels includes a bit location in each of said first shift register channels.

9. A combination in accordance with claim 8 wherein said sheet of magnetic material comprises yttrium orthoferrite.

10. A combination comprising a sheet of a magnetic material having substantially like characteristics regardless of direction in the plane of the sheet, input means for providing at an input position in said sheet a single wall domain having a boundary unconstrained by the boundary of said sheet and being free to move along a plurality of axes in the plane of said sheet, and first propagation means for controllably moving said domain along a first axis in said sheet in the absence of uncontrolled expansion along any other of said axes.

11. A combination in accordance with claim 10 including second propagation means for controllably moving said domain in said sheet along a second axis transverse to said first axis.

12. A combination comprising a sheet of a magnetic material having a preferred magnetization direction out of the plane of the sheet, input means for providing a single wall domain at an input position in said sheet, and first propagation means for controllably moving said domain along a first axis in said sheet.

13. A combination in accordance with claim 12 including second propagation means for controllably moving said domain in said sheet along a second axis transverse to said first axis.

14. A combination comprising a sheet of magnetic material, input means for providing a single wall domain in said sheet, and first propagation means for controllably moving said domains along a first axis in said sheet.

15. A combination in accordance with claim 14 including second propagation means for controllably moving said domain in said sheet along a second axis transverse to said first axis.

16. A data processing arrangement comprising a medium, means for providing in said medium an entity having a boundary unconstrained by the boundary of said medium and being free to move along a plurality of axes in a plane of movement in said medium, and first and second propagation means for selectively moving said entity in said medium along first and second of said axes transverse to one another in the absence of uncontrolled expansion along the nonselected axes.

References Cited

Publication I, Journal of Applied Physics, vol 37, No. 7, June 1966, pp. 2584–2593 (Controlled Domain Tip Propagation, Part II, by Spain & Jauvtis).

JAMES W. MOFFITT, Primary Examiner

UNITED STATES PATENT OFFICE
CERTIFICATE OF CORRECTION

Patent No. # 3,460,116 Dated August 5, 1969

Inventor(s) Andrew H. Bobeck et al.

It is certified that error appears in the above-identified patent and that said Letters Patent are hereby corrected as shown below:

Column 3, line 75, "input pulse Pi" should read -- input pulse P17 --. Column 5, line 70, "of single wall domain" should read -- of a single wall domain --. Column 6, line 28, "and move than" should read -- and more than --. Column 7, line 15, "in a first direction" should read -- along a first axis --.

Signed and sealed this 11th day of August 1970.

(SEAL)
Attest:

EDWARD M.FLETCHER,JR.
Attesting Officer

WILLIAM E. SCHUYLER, JR.
Commissioner of Patents

FORM PO-1050 (10-69)

USCOMM-DC 60376-P69
☆ U.S. GOVERNMENT PRINTING OFFICE : 1969 O—366-334